(12) United States Patent
Fredriksson

(10) Patent No.: US 6,327,857 B1
(45) Date of Patent: Dec. 11, 2001

(54) DEVICE, METHOD AND APPLICATION IN CONNECTION WITH A TURBOMACHINE AND PUMPING AND LUBRICATING ARRANGEMENT IN CONNECTION WITH SUCH A MACHINE

(76) Inventor: Carl Fredriksson, Kransen 5, S-416 72, Göteborg (SE)

( * ) Notice: Subject to any disclaimer, the term of this patent is extended or adjusted under 35 U.S.C. 154(b) by 0 days.

(21) Appl. No.: 09/529,945

(22) PCT Filed: Oct. 8, 1998

(86) PCT No.: PCT/SE98/01815

§ 371 Date: Apr. 21, 2000

§ 102(e) Date: Apr. 21, 2000

(87) PCT Pub. No.: WO99/20880

PCT Pub. Date: Apr. 29, 1999

(30) Foreign Application Priority Data

Oct. 23, 1997 (SE) .................................................. 9703860

(51) Int. Cl.[7] .................................................. F02B 33/44
(52) U.S. Cl. ............................. 60/605.3; 60/605.1
(58) Field of Search ................................. 60/605.3, 605.1

(56) References Cited

U.S. PATENT DOCUMENTS

| | | |
|---|---|---|
| 2,784,551 | 3/1957 | Karlby et al. . |
| 4,080,783 | 3/1978 | Hamburg et al. . |
| 4,390,082 | 6/1983 | Swearlingen . |
| 4,838,028 | 6/1989 | Witt . |
| 4,926,641 | * 5/1990 | Keller .................................. 60/605.3 |
| 4,927,336 | * 5/1990 | Rossmann et al. ............. 60/605.3 X |
| 5,253,985 | 10/1993 | Ruetz . |

FOREIGN PATENT DOCUMENTS

| | | |
|---|---|---|
| 1196016 | 7/1965 | (DE) . |
| 2106589 | 9/1971 | (DE) . |
| 36 44 356 | 7/1988 | (DE) . |
| 0 801 217 | 10/1997 | (EP) . |
| 1281842 | 7/1972 | (GB) . |

\* cited by examiner

*Primary Examiner*—Hoang Nguyen
(74) *Attorney, Agent, or Firm*—Connolly Bove Lodge & Hutz, LLP

(57) ABSTRACT

In a model jet engine, one or more slide bearings are disposed on one or more turbo shafts. Additionally included are lubricant, a tank system for the latter and an arrangement for supplying lubricant to a respective bearing. The lubricant is incorporated in the propellant of the turbomachine. A propellent-supplying arrangement comprises one or more pump impellers directly coupled to a concerned turbo shaft. The tank system is arranged so as to supply propellant to the arrangement without any substantial air/gas element. The arrangement is arranged to operate on the basis of recirculation of the propellent, which can be supplied to the respective slide bearing from the one side of the latter and can be fed back to the tank system from the other side of the slide bearing.

19 Claims, 7 Drawing Sheets

Figure 1:
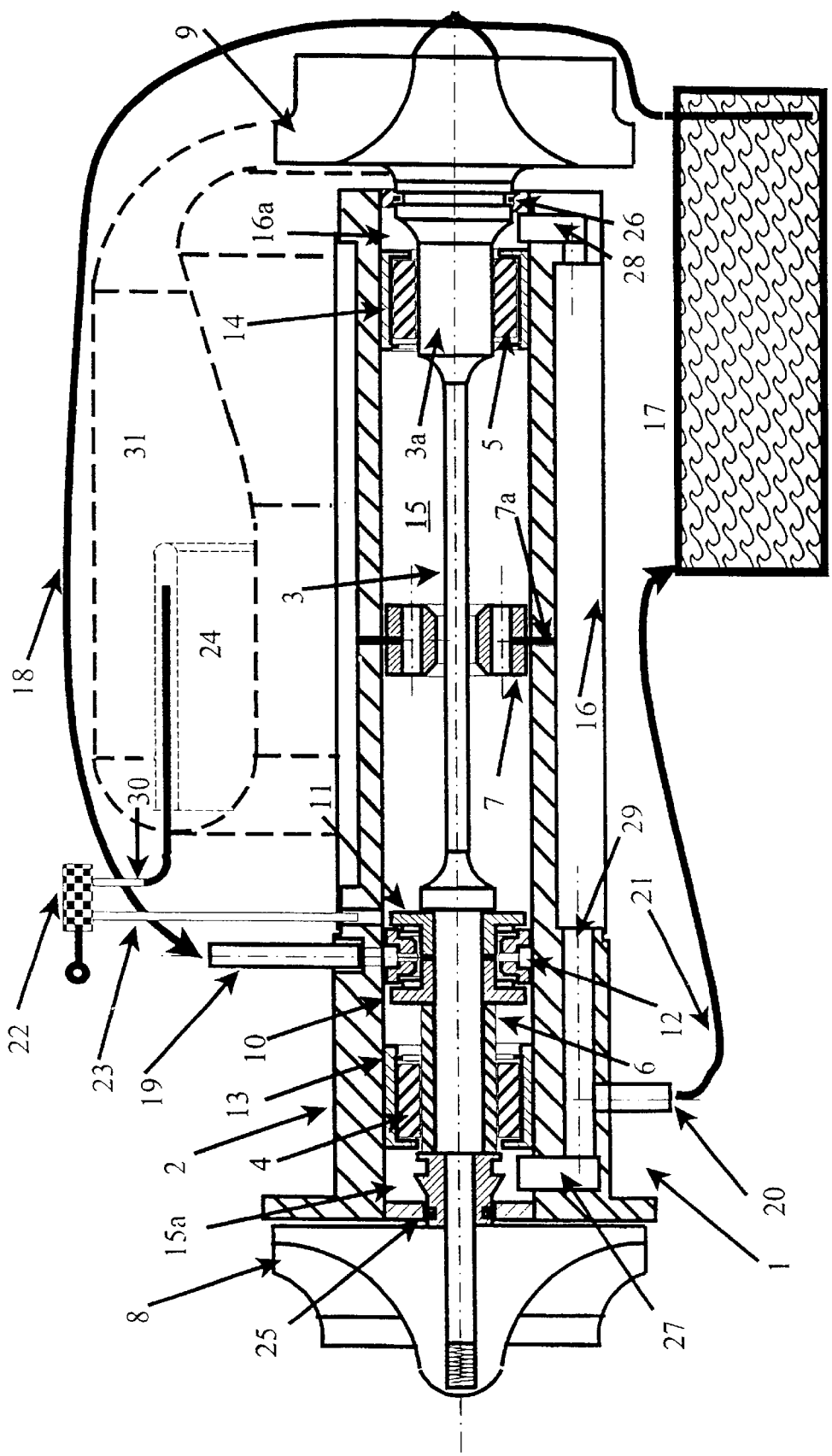

DEVICE, METHOD AND APPLICATION IN CONNECTION WITH A TURBOMACHINE AND PUMPING AND LUBRICATING ARRANGEMENT IN CONNECTION WITH SUCH A MACHINE

Device, method and application in connection with a turbomachine and pumping and lubricating arrangement in connection with such a machine.

The present invention relates to a device in connection with a turbomachine, e.g. in the form of a model jet engine or turbo-charger, in which one or more slide bearings are disposed on one or more turbine shafts. The device utilizes lubricant, a tank system for this and an arrangement for supplying lubricant to the respective bearing. The invention also relates to a process for realizing, in a turbomachine having a turbine shaft, pump impeller and inlet unit for lubricant or lubricant-equipped propellent, joined-together assembly for a pumping and lubricating arrangement for or in the machine. The invention also relates to an integrated pumping and lubricating arrangement for a turbomachine, in which arrangement two or more bearings are disposed on one or more turbine shafts. The arrangement utilizes lubricant, a tank system for this and an arrangement for supplying lubricant to the respective bearing.

The invention also relates to the application of a fan arrangement in a jet engine which is equipped with an alternatively whole or divided engine shaft and which is primarily intended for a model aeroplane in which the fan arrangement is placed on the engine shaft in front of the compressor to the engine and in which a thrust on the aeroplane, generated by the engine, is related to the speed of the aeroplane and the frontal area of the engine. The invention also relates to a device for ensuring a small, or small as possible, frontal area dimension of a jet engine, primarily for a model aircraft in which the engine comprises an engine shaft and a compressor applied thereto and a fan arrangement disposed on the engine shaft in front of the compressor. Included under the term "model aircraft" are miniature-based aircraft of various types, i.e. including those aircraft which are used in a context other than for pure model flying, e.g. in a combat context.

PRIOR ART

Current model jet engines generally incorporate conventional deep-groove ball bearings which are lubricated with turbine oil. The oil in question is stored in a separate oil tank with the aid of compressor pressure. The fuel system can comprise a fuel tank, electric fuel pump and batteries for driving the pump. The total weight of all the components involved is approx. 500 grammes excluding the weight of the fuel.

So-called "fan engines" are previously known and are normally used on all current jet aircraft. Reference is made, inter alia, to the standard work "Gas Turbine Theory" by H. Cohen et al, "ISBN 0-582-30539-X". It can be seen from page 100 that for aircraft requiring low air resistance (and hence a small frontal area) it is necessary to keep the so-called "by-pass ratio" low, by which is meant between 0.5 and 1. It can further be seen from the cited reference location that the use of a high by-pass ratio (exemplified as 5) results in increased air resistance due to the increasing frontal area. There is also a widespread view that a fan engine with high by-pass ratio demands a twin-spool, varied twin-spool or triple-spool construction. Compare also the reference according to the above, on page 102, FIG. 3.18.

ACCOUNT OF THE INVENTION

Technical Problem

In model aircraft and other advanced small aircraft, for example, there is a need to be able to reduce the weight of components involved. The invention aims to solve this problem, inter alia, and proposes an arrangement in which specifically oil tank, oil pump, fuel pump and batteries can be wholly eliminated or substantially reduced in weight.

There is also a need for a more reliable system with fewer components. In addition, there is a wish to be able to eliminate rotary seals which are difficult to make seal-tight. The turbine shaft or shafts must be able to rotate at high speed and there is here a need to be able to dispose the system or arrangement such that the effects of critical rotation speeds can be eliminated. There is additionally a requirement for operating reliability. If the pump packs up, for example, then the result is that the engine stops directly due to a loss of fuel pressure and the bearings are saved from damage. There is also a need to be able to eliminate the risks of so-called "coking-up". There is additionally a need for environmentally friendly jet engines. The invention aims to solve these problems also.

Moreover, fuel consumption must be able to be kept low, as must the temperature in the body/shell of the jet engine. There is also a need to obtain increased thrust in spite of small outer dimensions. A brake arrangement must be able to be disposed rapidly and effectively on the aircraft in question. The invention solves these problems also.

With the coming into being of the present invention, the inventor has managed to combat technical prejudices in this field. There is a widespread view amongst experts in the field, for example, that a high by-pass ratio produces a low specific fuel consumption and high static thrust at the cost of a large frontal area. This view, inter alia, diverts the expert from seeking solutions according to unconventional methods, which necessitated the present invention. Despite the above prejudices, the need for a small frontal area relative to the thrust is satisfied by applying a concept which is based upon a fan engine with high by-pass ratio and the fan is mounted directly on the main shaft of the engine.

There is also a reluctance, in purely general terms, to use jet engines in the context of a model aeroplane, since they give off hot gases. The jet engine represents those types of engine which operate with an open flame behind. The invention aims to solve this problem also, inter alia, by proposing to let the fan air mix with the exhaust gases from the turbine such that the outlet temperature from the engine remains relatively low, e.g. below 300° C., which is below the ignition temperature for most commonly occurring combustible materials. By letting the fan air swill around the hot parts of the engine, a low temperature is obtained on the outer shell of the engine, making installation in model aircraft simple.

There is also a need to obtain rapid changes in the thrust of the engine. This problem also is solved by the invention. It is proposed by the invention that the fan current should be regulated. It can also be advantageous to utilize a radial turbine in the engine. Radial turbines are often the most effective turbine in small jet engines but have a greater moment of inertia than equivalent axial turbines. In purely general terms, this is considered a drawback from the regulating view-point, since rotation speed changes occur slowly in response to fuel supply. By simultaneously regulating the fuel supply and by-pass ratio, in accordance with the present invention, the thrust can be rapidly altered within wide boundaries as a result of the rotation speed being broadly constant.

There is also a wish to be able to reverse the direction of the exhaust gases in a brake context. This problem is solved by the invention by virtue of the low exhaust gas temperature. Reversing devices can thus be used to regulate quickly the thrust of the engine, e.g. upon take-off and landing.

In the case, specifically, of model aircraft, there is a wish to be able to achieve true-to-scale models. There is hence a wish, for example, that jet aeroplanes should be able to be built with associated jet engines. Problems arise in reducing the dimensions of the jet engine, with the result that the jet engine has often been determinant of the size of the model. In order to maintain trueness to scale, it has hitherto been proposed to utilize conventional combustion engines in which the problem in question has not been present. The drawback with this has been that the application of jet engines to the said models has had to be abandoned. The invention solves this problem also.

With jet engines of this type, there are also problems from a regulating viewpoint as regards the speed of the aircraft. The aircraft should be maneuverable from a minimum speed to a maximum speed during a certain time span. Hitherto proposed arrangements have resulted in the engine having exhibited a poor response to acceleration, which has meant, inter alia, that the engine has easily choked or overheated in the event of excessively quick changes in acceleration, thereby giving rise to crash risks. The invention solves this problem also.

In such types of engines which are extremely fast-running (up to approx. 300,000 r.p.m.), there is therefore a need to be able to achieve an expedient thrust regulation. In accordance with one line of development of the subject of the invention, an effective thrust regulation can be effected by changing the mass flow of the fan. The invention solves this problem also.

Because of the extreme rotation speed, there are difficulties in obtaining expedient mounting of the engine shaft so that this can be allocated the desired dimensions. In this connection, the invention proposes, inter alia, an effective system for a combined lubricating oil and fuel oil supply. The system in question must therefore be able to ensure both that the engine receives a sufficient quantity of fuel and, at the same time, that the effective lubricating function is preserved. The invention solves this problem also.

The Solution

The solution to the problem of creating a model jet engine with a small frontal area relative to the thrust consists, inter alia, in using a fan engine with the fan directly mounted on the same shaft as the compressor and turbine. The by-pass ratio must be larger than 1, preferably around 3, but can be higher. The by-pass ratio is limited principally by the maximum permitted input temperature in the turbine. An engine according to the specified proposal solves large parts of the stated complex of problems. The invention is also based on the concept that a bearing system used in model aircraft, turbo-chargers, etc., shall be lubricated with fuel and that an in-built pump is arranged, which generates the flow to both bearing system and fuel system.

What can be considered more concretely characteristic of a device according to the invention is that the lubricant is incorporated in the propellent of the turbomachine, that the arrangement for supplying the lubricant comprises one or more pump impellers directly coupled to a concerned turbo shaft and that the tank system is arranged so as to supply propellent to the arrangement without any substantial air/gas element.

In one embodiment of the device, two slide bearings are utilized, arranged at a distance apart. The arrangement for supplying lubricant and propellent is arranged so as to feed the lubricant and propellent between the slide bearings. The arrangement can further comprise two pump impellers which distribute the lubricant and propellent and are each assigned their own direction in a space radially outside the turbine shaft in question, in which the pump impellers operate and the slide bearings are disposed. The pump housing preferably accommodates a part which interjects between the two pump impellers and in which the inlet for the propellent from the tank is disposed. At least one slide bearing is herein disposed on a raceway which is arranged so as to form part of a longitudinal-direction fixing mechanism and rotational-direction fixing mechanism relative to the concerned turbine shaft for the pump impellers/pump impeller arrangement. On their sides facing the interjecting part, the pump impellers are provided with recesses or grooves through which propellent can be conducted from the interjecting part and to the space surrounding the pump impellers and slide bearings. At the central free parts of the turbine shaft there is disposed a vibration-damping member, which prevents deflections/amplitudes above a certain level in the turbine shaft as the latter rotates. The concerned turbine shaft can have a stopping member which determines the longitudinal position of the pump impeller arrangement in the first direction. The turbine shaft can further have a section extending through the pump impeller arrangement. The raceway bears against an end surface of the pump impeller arrangement at its one end. At its other end, the raceway interacts with a seal, provided for the turbine shaft, between the raceway and the machine's compressor impeller. The turbine shaft is fixed to the compressor impeller, or vice versa. The pump impeller arrangement and the raceway are longitudinally fixed in the other direction also. A second slide bearing is disposed on a slide bearing raceway located directly on an outer surface of the turbine shaft. Further characteristics of the device can be gleaned from the subsequent sub-claims to the device.

A process according to the invention is principally characterized by the following steps. In a first step, a first pump impeller is provided for a first centre recess in the inlet unit in question. In a second step, the turbine shaft is applied by its first end to a centre recess in the mounting part of the first pump impeller and guided partially through the recess such that direct or indirect contact is established between the outside of the first pump impeller and a protruding member on the turbine shaft. In a third step, a second pump impeller is applied to the section jutting through the inlet unit of the turbine shaft. In a fourth step, a raceway is applied in rotationally fixed arrangement to the said section outside the second pump impeller. In a fifth step, a slide bearing is applied to the raceway. In sixth and seventh steps, a sealing arrangement is applied to the turbine shaft outside the raceway and a compressor impeller is fastened to that section of the turbine shaft outside the sealing arrangement.

An integrated pumping and lubricating arrangement according to the invention can principally be considered to be characterized in that one or more feed lines to a pump acting as an axial bearing for the bearing system are disposed between two slide bearing arrangements, in that the tank system and the lubricant-supplying arrangement are arranged so as not to operate with pressurized lubricant during running of the machine, in that the lubricant-supplying arrangement generates a supply of lubricant to slide bearing arrangements from their first side, and in that lubricant which passes through the slide bearing arrangements can be returned to the tank system from the other sides of the slide bearing arrangements on the basis of existing lubricant pressure.

Further special features of the said integrated pumping and lubricating arrangement can be gleaned from the subsequent sub-claims for the arrangement in question.

Advantages

In accordance with the above-proposed, advantageous solutions to structures of jet engines for model aircraft and other aircraft of corresponding size, as well as lubricating and bearing systems for such jet engines and also for turbo-chargers are obtained. As a result of that which is indicated in connection with model jet aircraft, major advantages are found for the aeroplane per se, e.g. lower specific fuel consumption, fewer components, and improved ease of handling by virtue of lower temperatures in the engine and at the output of the engine. Changes in thrust can be realised simply and rapidly. As a result of the invention, advantages are also found in terms of the bearing system. The fact that the bearing system operates with a small amount of play, due to low-viscosity lubrication, gives it the advantage that the plays present in compressor and turbine are able to be reduced, meaning improved efficiency for these components and reduced friction in the bearing system. The jet engine in question operates at very high rotation speed and it is essential that the bearing system and peripheral equipment are of low-weight design and open the way for component reductions, i.e. weight reductions, in connection with the aeroplane per se.

LIST OF FIGURES

Figure 2:
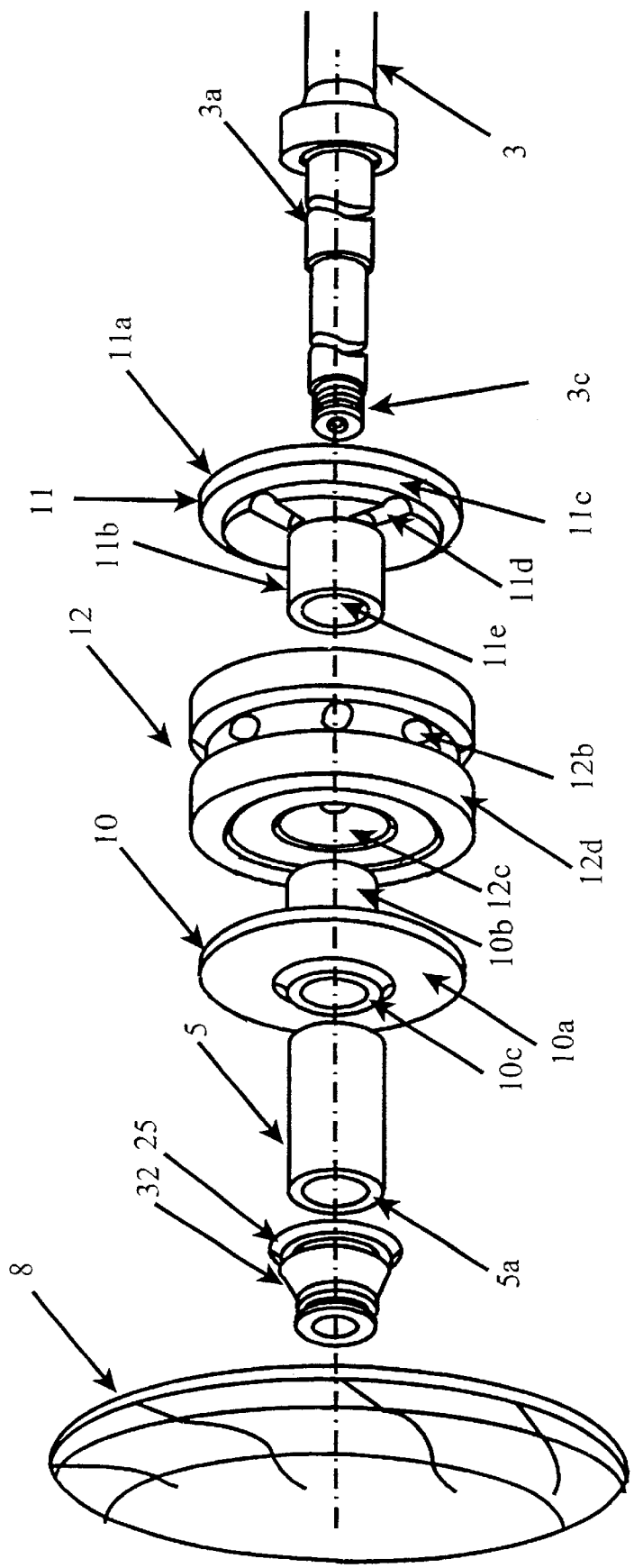
Figure 3:
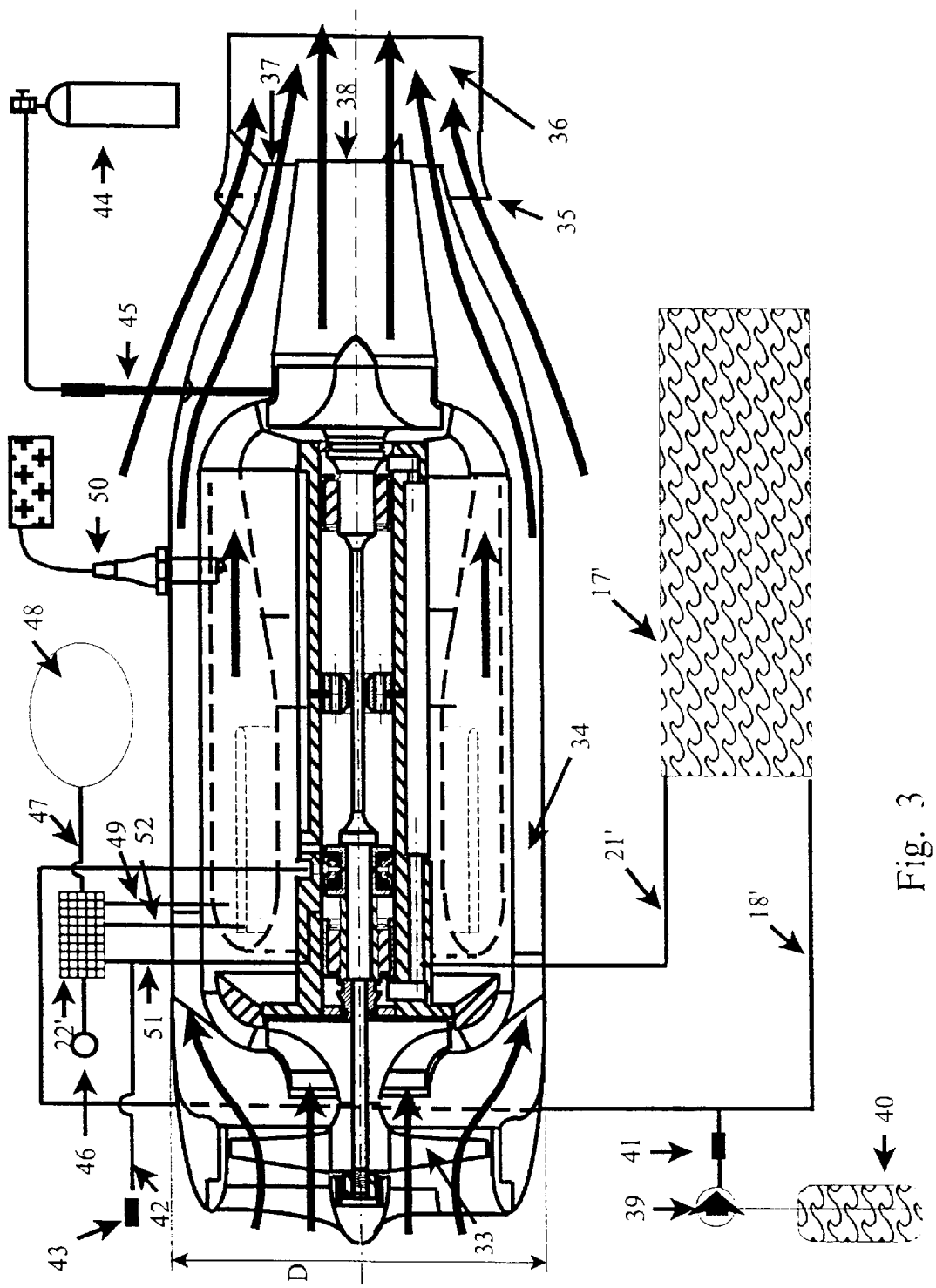
Figure 4:
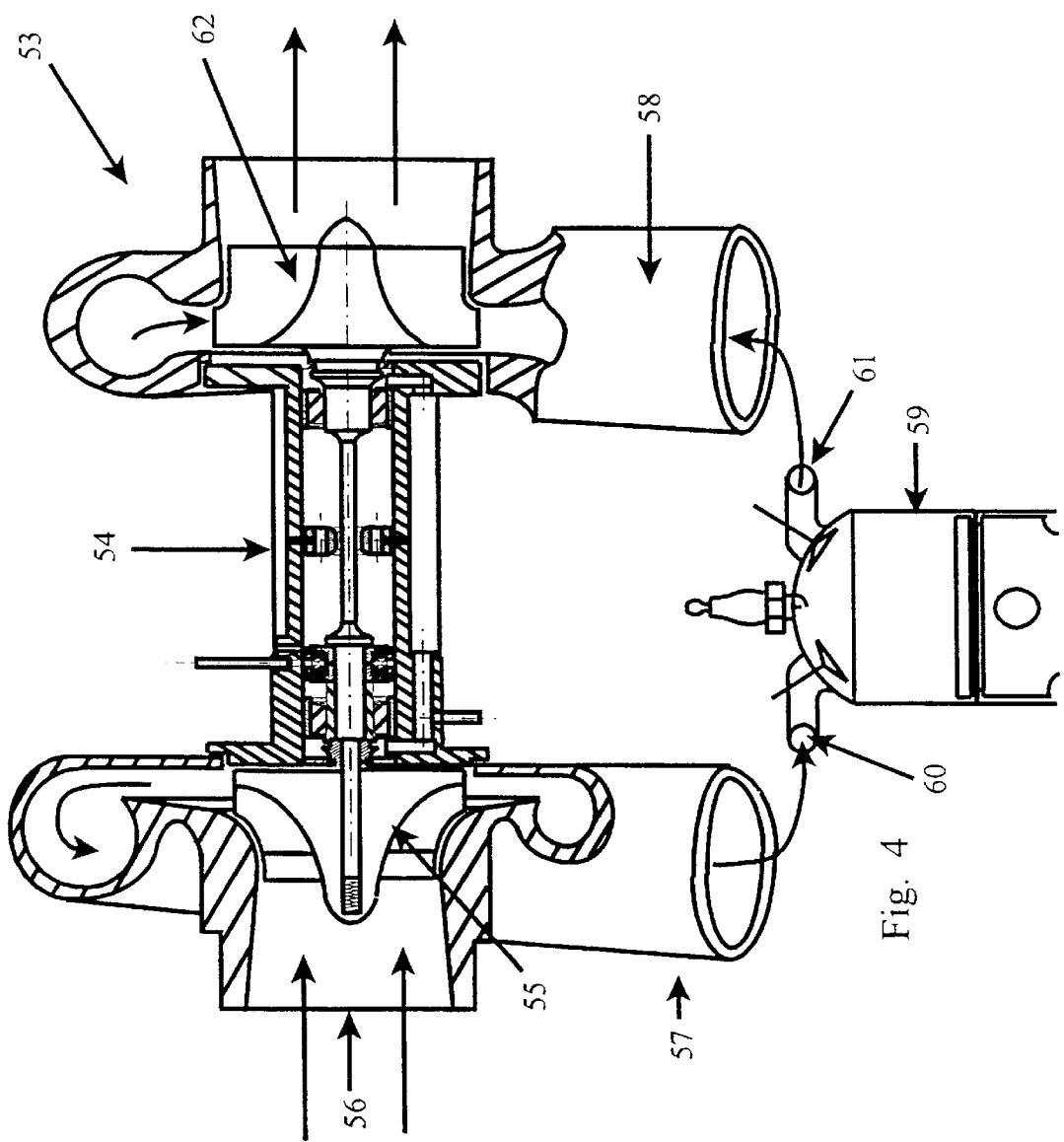
Figure 5:
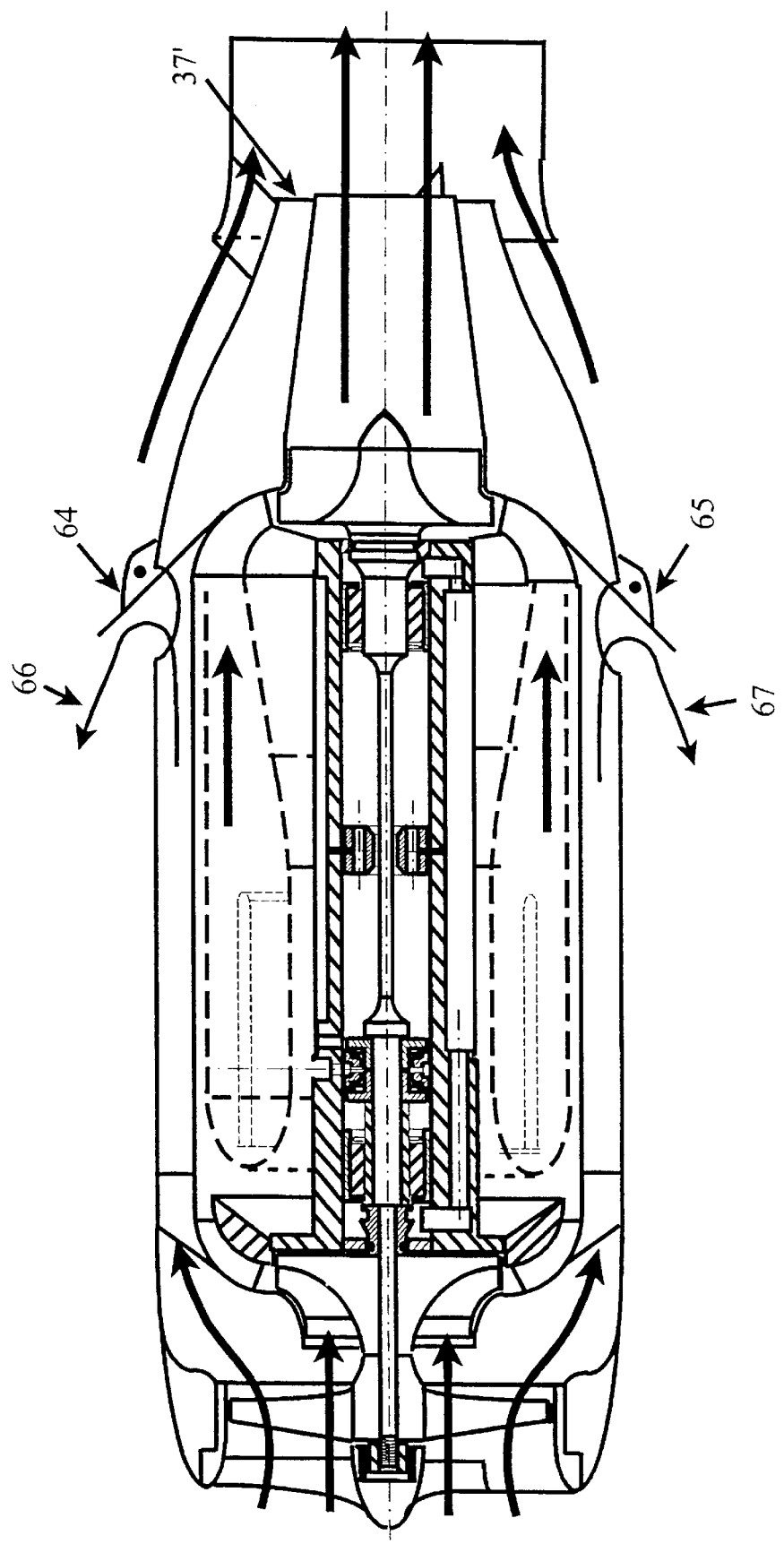
Figure 6:
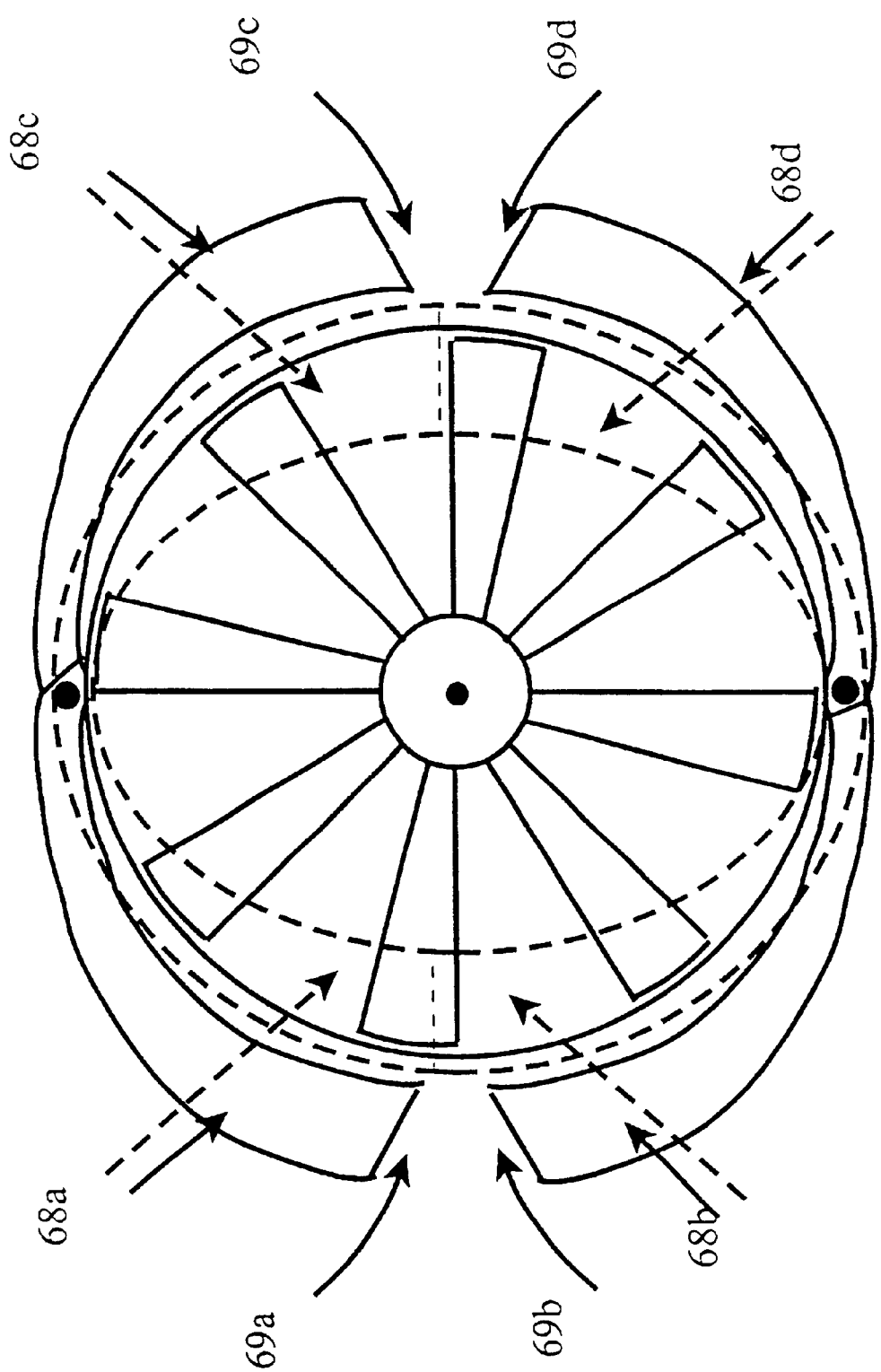
Figure 7:
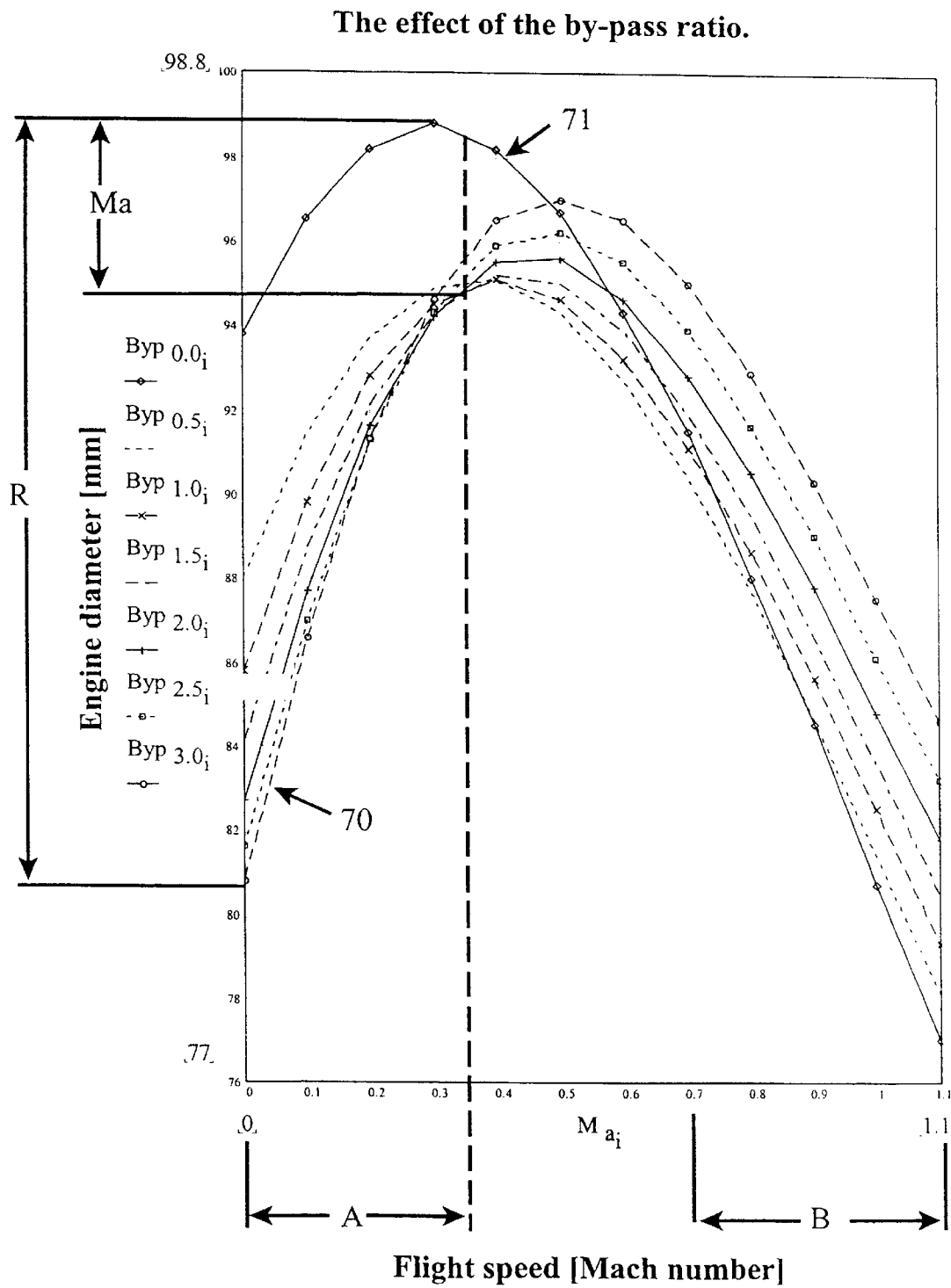

A currently proposed embodiment of a device, a process and an application in connection with model aircraft, turbo-chargers, etc. and an integrated pumping and lubricating arrangement shall be described below with simultaneous reference to the appended drawings, in which FIG. 1 shows, in longitudinal section and in schematic representation, the structure of a jet engine with associated components, FIG. 2 shows, in a view obliquely from the front, the structure of the bearing system, FIG. 3 shows, in longitudinal section, the jet engine according to FIG. 1, supplemented by a starting arrangement for the jet engine, FIG. 4 shows, from the side and partly in cross-section, parts of a turbo-charger, FIG. 5 shows, in longitudinal section, the jet engine according to FIG. 1, arranged with a braking arrangement, FIG. 6 shows, from the front, the engine according to FIG. 5, and FIG. 7 shows, in diagram form, the relationship between flight speed, engine diameter and by-pass ratios.

DETAILED ILLUSTRATIVE EMBODIMENT

In FIG. 1, parts of a jet engine which are affected by the present invention are denoted by 1. The jet engine incorporates a body part 2 and a turbine shaft 3 mounted in the body part. The turbine shaft is mounted in two slide bearings 4 and 5 at their respective ends. The slide bearing 4 is disposed on a slide bearing raceway 6. The slide bearing 5 is mounted on a part 3a of the turbine shaft. At its central parts there is disposed an amplitude damper 7, which dampens outswings of the shaft in accordance with the above.

Disposed on the shaft or fastened thereto, on the inlet side of the engine, there is a compressor impeller 8. At the other end of the turbine shaft, the turbine wheel 9 is fastened. The engine also comprises a pump arrangement 10, 11 and 12. The slide bearing 4 is mounted in a bearing housing 13 and the slide bearing 5 is mounted in a slide bearing housing 14. The said shaft, bearing arrangement, pump arrangement and damping arrangement are disposed within a space 15 in the engine shell 2. In addition, outside the said space and engine shell, a return casing 16 is present, which extends around the engine shell. The said pump arrangement 10, 11 and 12 is arranged so as to provide the engine with fuel and the bearing system with lubricating oil. The combined fuel medium and lubricant has low viscosity and is stored in a tank or reservoir 17. Leading from the tank is a feed line for the medium, which feed line bears the notation 18. At the body or shell 2, a feed pipe 19 is arranged. In addition, the shell or body 2 is provided with an outlet part 20 to which leads a feedback line for the fuel. The latter line is indicated by 21. Also included is a valve 22. Connected to the valve is a fuel-drainage pipe 23. A fuel carburetor is symbolized by 24. A seal for sealing the compressor impeller for the space 15 is indicated by 25. A seal for the turbine wheel is denoted by 26. The damping arrangement 7 is fastened to the body or the shell 2 with securing members 7a. The casing 16 is internally fuel-conducting, i.e. has internal ducts, and is also connected to ducts 27, 28 leading from the part-space 15a, 16a outside the respective slide bearing 4, 5. The casing 16 is internally connected to the duct 27 by a duct 29. From the valve 22, a fuel pipe 30 leads into the carburetor 24. In FIG. 1, a fuel chamber is symbolized by 31.

The pump arrangement 10, 11 and 12 comprises, in principle, two pump impellers 10 and 11 and a part 12 which interjects between radially protruding flanges on the pump impellers. The bearing system is described in greater detail below.

The engine shown in FIG. 1 functions as follows. The fuel tank 17 is connected in this way to the pump inlet 19, through which the fuel is introduced into the pump housing 12. With the aid of the pump impellers 10, 11, the pressure is increased to 4 bar, for example, in order to achieve a minimum pressure ratio of 2 across the valve 22 via the fuel-drainage pipe 23. The pressure ratio across the valve 22 is chosen at 2 on the basis that pressure disturbances in the burner 31 must not resonate with the fuel system. It would actually be possible to increase the pressure to 50 bar and use conventional spray nozzles, but an arrangement of this kind is not favoured in the shown illustrative embodiment.

In accordance with the following, the pump impellers 10 and 11 have a flat surface at their respective peripheries. These flat surfaces bear against the pump housing 12 and act in the manner of axial bearings for the turbine shaft 3. After the fuel has passed through the pump 10, 11, it is forced forward to the slide bearing 4 and passes through this slide bearing to the other side of the slide bearing, i.e. to the space 15a. The pump arrangement also forces the fuel in the other direction, inter alia up into the fuel-drainage pipe 23. The pump arrangement also forces the fuel towards the amplitude damper 7 and past this to the slide bearing 5 in order to lubricate this same. The fuel passes also through the slide bearing 5 and makes its way out into the space 16a The fuel which has thereby been forced out into the spaces 15a and 16a is fed back through the ducts 27, 28, 29 out to the fuel outlet and onward, through the line 21, back to the tank 17. The task of the amplitude damper 7 is to limit oscillations of the turbine shaft, in accordance with the above, whenever the latter goes through the natural oscillation speed. The space 15 is filled with fuel, which increases the damping and hence makes it easier to come through the natural oscillation speed. Apart from re-conducting the return fuel, the return casing 16 has the task also of preventing the thermal radiation from the combustion chamber 31 from excessively heating the bearing housing. The feedback of fuel through the line 21 is forced back to the tank with the aid of the penetrating air leak through the seals 25 and 26 at the compressor and turbine respectively. Since the engine per se is previously known, along with components necessary for its functioning, no closer description shall here be provided but rather reference is made to the average expert's knowledge in this field.

FIG. 2 shows the pump arrangement in greater detail. The pump arrangement is shown in exploded diagram form. The pump impellers 10 and 11 each comprise their disc-shaped part 10a and 11a and a mounting part 10b and 11b respectively. The abovementioned plane surface, which contributes to the axial fixing of the turbine shaft 3, is shown on the disc 11 and indicated by 11c. A corresponding surface is found on the disc 10a. The said surface 11c interacts with a corresponding surface on the pump housing 12. The one corresponding surface is here denoted by 12a, which does not necessarily need to be flat as in the figure but can instead have lubricating grooves. The pump housing is provided with a number of radial holes 12b, through which fuel is forced as fuel is fed in from the tank system according to the above. The pump housing has a bearing space 12c for the said mounting parts. The respective pump impeller also preferably has radially extending recesses 11a. The pump housing 12 heads for the inner wall of the recess 15 (see FIG. 1) by way of peripheral surfaces 12d. The hole arrangement 12b is disposed in a countersunk part in the pump housing, via which countersunk part the fuel is thus fed down towards the centre of the pump housing. The pump impellers are mounted in the bearing space 12c by way of their respective mounting parts 10b and 11b. In joined-together states of the impellers and housing, the fuel will thus be introduced from outside via the recesses 12b and forced over the peripheries of the mounting parts 11b and out into the space 15 via the radial recesses 11d. The mounting parts 10b and 11b have through-recesses 11e for part of the turbine shaft 3, which part is indicated by 3a. The pump impeller 10a has a contact surface 10c against a corresponding end surface on the slide bearing 5. The slide bearing 5 has at its opposite end a contact surface 5a, which bears against a sealing arrangement 32 bearing the said seal 25. The pump impellers and the pump housing can thus be brought together and the turbine shaft part 3a is interjected in the recesses 11e and a corresponding recess in the impeller 10 so that the turbine shaft part projects beyond the pump impeller 10. The slide bearing 5 can thereafter be threaded on the shaft, as can the compressor sealing part 32, after which the compressor impeller 8 is threaded on and all the said components fixed to the turbine shaft 3 by means of a nut (not shown in FIG. 2) on an external thread 3c on the part 3.

In FIG. 3, the embodiment according to FIG. 1 is further supplemented by, inter alia, a fan 33, a fan duct 34, an ejector 35 and an outlet pipe 36. The figure also illustrates a fan outlet 37. In addition, flow arrows are shown for fan air and outlet. An outlet nozzle has been indicated by 38. The above components and functions are known per se and shall not be described in greater detail here.

FIG. 3 additionally illustrates a starting process arrangement. Incorporated in this case are the tank 17', the feed line 18', the feedback line 21' and the valve 22' in accordance with FIG. 1 The fuel tank 17 is filled with the aid of a pump 39 from an external fuel reservoir 40 via, for example, a rapid-action ball coupling 41. At the same time as the tank 17' is filled, fuel is forced into the bearing system (cf. above) and is aerated by virtue of the fact that a fuel pressure conduit 42, which is connected to a fuel line from the valve 22', is open. Once there is only fuel spurting out from the line 42, the line is stopped with a plug 43, i.e. when all air is out of the bearing system and there is only fuel spurting out. The turbine can thereafter be spun up to starting speed with the aid of a compressed air vessel 44, which is connected to the starting pipe 45 of the engine. A valve arm 46 to the valve 22' is set to the start position, meaning that starting fuel, e.g. In the form of propane gas, is able to flow into the valve/the valve housing 22' via a gas conduit 47 from a starting fuel tank 48. From the valve housing, the starting fuel is led directly down into the engine via the starting fuel pipe 49 of the engine. The starting fuel is ignited with the aid of a spark plug 50. Once the engine has idled for about 10 seconds, the valve arm 46 is put into the idle position and thereupon shuts off the starting fuel and opens the fuel pressure conduit 51 to the fuel inlet pipe 52 of the engine. The fuel which has acted as lubricant is led back to the fuel tank 17' through the return fuel pipe 18'. Once the engine is ticking over stably, the starting fuel tank 48 and the compressed air vessel 44 are disconnected. The starting fuel tank can comprise a small starting ampoule, which is used up during take-off and is fixedly installed in the aeroplane.

FIG. 4 aims to show that the above-described bearing system can also be utilized in connection with a turbocharger 53 of a type which is known per se. The bearing housing is here symbolized by 54. A compressor is denoted by 55 and an air intake by 56. The compressor connection is indicated by 57 and the turbine connection by 58. In addition, a piston engine is symbolized by 59 and the suction intake of the piston engine by 60 and exhaust-gas outlet by 61. The turbine wheel has been denoted by 62 and the outlet for exhaust gases by 63.

FIG. 5 shows a refinement of the engine according to the embodiment according to FIG. 3. In this case, a brake arrangement has been able to supplement the engine. The brake arrangement comprises lowerable flaps 64 and 65, which reverse at least parts of the fan current 66, 67.

FIG. 6 shows a flap arrangement placed in front of the fan 3. The system comprises the flaps 68 a,b,c,d. In the lowered flap position, denoted by motion in the direction a,b,c,d of the arrows 69 to the new position of the flaps 68 a,b,c,d, which new position is represented by dashed lines, the flaps throttle the fan air flow out via the fan discharge port 37' in FIG. 5. In the raised flap position, a full fan air flow is obtained.

FIG. 7 shows the effect upon the outer diameter of the engine as a function of the by-pass ratio and the flight speed at a certain given thrust (75 Newton). A number of curves have been shown in the figure, in which the vertical axis of the graph shows the by-pass ratio and the horizontal axis shows the flight speed. The small aircraft associated with the invention (e.g. the model aircraft) are affected in accordance with the invention by the flight speed zone indicated by A, i.e. flight speeds between 0 and 0.35 Mach (MA). Also included in the graph is a zone for conventional large jet aircraft, whose corresponding zone has been indicated by B, which zone lies within the Mach number range of 0.7 and above (e.g. 1.1). In accordance with the above, there are prerequisites for the engineer working within the zone B to apply basic principles which are contrary to prerequisites prevailing within the zone A. In purely general terms, for jet engines the average expert and the specialist act upon relationships which are usable within the zone B. This action is contrary, in principle, to relationships prevailing within the zone A and the relationships according to A cannot be transferred directly to the relationship within the zone B, and vice versa. A number of curves are shown in the figure and include, inter alia, maximum and minimum curves for the by-pass ratio, which are indicated by 70 and 71 respectively.

The curve 70 shows the by-pass ratio 3, which means that three times more air is conducted through the fan than through the compressor. The curve 71 shows the by-pass ratio nil, i.e. where no fan is utilized. Indicated in the figure, on its left-hand side, is the quantity Ma, which in the case illustrated measures 0.35. R shows the case involving the possible reduction of diameters in stationary or aircraft or aircraft coming to a standstill. It can thus be established from the graph that an increased by-pass ratio in the zone A gives rise to a smaller diameter, whilst in the zone B it is indicated that an increased by-pass ratio produces a larger diameter D. As regards the diameter in question, reference is made to FIG. 3, in which the diameter is indicated by D. By the word diameter is meant, of course, the frontal area and in cases in which a departure has been made from the essentially circular frontal area a corresponding value of the frontal area design in question shall apply.

In accordance with the inventive concept, some measures are proposed in connection with the above. The turbine shaft part which has to be prevented from performing large radial amplitudes at critical speeds and is dampened by the damping device in question should work to maximum wobble requirements of 0.03 mm or less. The relation between the pump and the bearing surface area should be 0.03–0.3 mm. The disc-shaped part of the respective pump impeller part should have an axial bearing surface which is designed to prevent substantial longitudinal displacement motions in the turbine shaft and should exhibit a fine-machining level of at least Ra6. 90% of the propellent should be able to be circulated through the slide bearing arrangements and remaining propellent should be fed to an engine combustion chamber. In connection with model aeroplanes which are to be sized relatively small or according to scale, in one embodiment it can here be envisaged that the model aircraft or corresponding aircraft should measure ¼–⅒ of the full-scale size. The said diameter D in FIG. 3 shall preferably lie within the range 35–350 mm, with preference for values around 100 mm. The frontal area in question should preferably lie within the range 1,000–100,000 mm$^2$. Preference is here for values around 8,000 mm$^2$. The gas velocity in the outlet ducts of the engine is chosen at about 200 m/s. The max. speed of the aircraft in question can be about 450 km/hour. The relation static thrust/cross-sectional area of the engine is chosen within the range 1.0–2.0 Newton/cm$^2$. Preference is in this case for values around 1.5 Newton/cm$^2$.

The said vibration-damping members should prevent deflections/amplitudes above a level of preferably 0.2 mm or less. A play between respectively the aforesaid slide bearing and its associated raceway is preferably in the order of magnitude of 0.01–0.05 mm.

The invention is not limited to the embodiment shown by way of the example above but can be subject to modifications within the scope of subsequent patent claims and the inventive concept.

What is claimed is:

1. A device in connection with a turbomachine, in which one or more slide bearings are disposed on one or more turbine shafts and utilize lubricant, a tank system for the lubricant and an arrangement for supplying lubricant to the respective bearing, characterized in that the lubricant is incorporated in the propellent of the turbomachine, that the arrangement for supplying the lubricant comprises one or more pump impellers directly coupled to a concerned turbo shaft and that the tank system is arranged so as to supply propellent to the arrangement without any substantial air/gas element and where two slide bearings are arranged at a distance apart, where the arrangement for supplying lubricant and propellent is arranged so as to feed the lubricant and propellent between the slide bearings and in that the arrangement comprises two pump impellers which distribute the lubricant and propellent and are each assigned their own direction in a space radially outside the one or more turbine shafts in which the pump impellers operate and the slide bearings are disposed.

2. The device according to claim 1, characterized in that a pump housing accommodates a part which interjects between two pump impellers and in which the inlet for the propellent from the tank is disposed, in that at least one slide bearing is disposed on a raceway which is arranged so as to form part of a longitudinal-direction fixing mechanism and rotational direction fixing mechanism relative to the concerned turbine shaft for the pump impellers/pump impeller arrangement, in that on their sides facing the interjecting part the pump impellers are provided with recesses or grooves through which propellent can be conducted from the interjecting part and to the space surrounding the pump impellers and slide bearings, and in that at the central parts of the turbine shaft there is disposed a vibration-damping member, which is arranged to prevent deflections/amplitudes in the turbine shaft as the latter rotates, which level is 0.2 mm or less.

3. The device according to claim 1, characterized in that the concerned turbine shaft has a stopping member which determines the longitudinal position of the pump impeller arrangement in the first longitudinal direction, in that the turbine shaft has a section extending through the pump impeller arrangement, in that the raceway bears against an end surface of the pump impeller arrangement at its one end, in that at its other end the raceway interacts with a seal, provided for the turbine shaft, between the raceway and the machine's compressor impeller, in that the turbine shaft is fixed to the compressor impeller, the pump impeller arrangement and the raceway being longitudinally fixed in the other direction also, in that a second slide bearing is disposed on a slide bearing raceway located directly on an outer surface of the turbine shaft, and in that the play between respectively the slide bearing and its associated raceway is in the order of magnitude of 0.01–0.05 mm.

4. The device according to claim 1, characterized in that the respective pump impeller constitutes or has an essentially disc-shaped part which, on its inlet-facing surface, bears the recesses/grooves, or in that the respective disc-shaped part has an axial bearing surface which is designed to prevent substantial longitudinal displacement motions in the turbine shaft and exhibits a fine-machining level/machining level/flatness level of at least Ra6 and a maximum wobble requirement of 0.03 mm or less, in that radial recesses terminate before the bearing surface; the outer diameter relationship between pump and bearing surface being 0.4–0.8, and in that the one pump impeller has a distancing part which is located or can be inserted in a center recess in the interjecting art.

5. The device according to claim 1, characterized in that the tank system and the propellent-supplying arrangement operate on a recirculation basis and in that the propellent which can be supplied to the respective slide bearing from the one side of the latter can be fed back to the tank system from the other side of the slide bearing.

6. The device according to claim 1, characterized in that the space is also connected to the combustion chamber of the turbomachine, in that a first part of the propellent pumped by the pump impellers from the tank system into the space can be conducted from the space to the combustion chamber, and in that the propellent is chosen in order to attain low-viscosity lubrication.

7. The device according to claim 1, characterized in that the supply is arranged such that the turbine shaft part extending within a pump housing is wholly surrounded by propellent during running, thereby reducing the problem of critical speeds for the particular turbine shaft by damping the radial oscillations of the turbine shaft part, in that during running of the turbomachine the propellent can be fed to the combustion chamber under pressure generated by the pumps, in that a separate propellent-pressurization arrangement is arranged so as to operate momentarily during the initial stage, and in that the cubic capacity of the space is chosen to ensure guaranteed lubricating function whenever there is a loss of propellent pressure.

8. A process for realizing, in a turbomachine having a turbine shaft, pump impeller and inlet unit for lubricant or lubricant-equipped propellent, joined-together assembly for a pumping and lubricating arrangement for the machine, characterized by the following steps:

a) a first pump impeller is provided for a first center recess in the inlet unit;

b) a turbine shaft is applied by its first end to a center recess in the mounting part of the first pump impeller and guided partially through the recess such that direct or indirect contact is established between the outside of the first pump impeller and a protruding member, c) a second pump impeller is applied to the section jutting through the inlet unit of the turbine shaft, d) a raceway is applied in rotationally fixed arrangement to the said section outside the second pump impeller, e) a slide bearing is applied to the raceway, f) a sealing arrangement is applied to the turbine shaft outside the raceway, and g) a compressor impeller is fastened to that section of the turbine shaft outside the sealing arrangement;

characterized in that lubricant is blended in or is constituted by the propellant for the turbomachine which is supercharged by the turbo unit, and in that a greater part of the propellent can be circulated through the slide bearing arrangements and remaining propellent can be fed to an engine combustion chamber.

9. A process for realizing, in a turbomachine having a turbine shaft, pump impeller and inlet unit for lubricant or lubricant-equipped propellent, joined-together assembly for a pumping and lubricating arrangement for the machine, characterized by the following steps:

a) a first pump impeller is provided for a first center recess in the inlet unit;

b) turbine shaft is applied by its first end to a center recess in the mounting part of the first pump impeller and guided partially through the recess such that direct or indirect contact is established between the outside of the first pump impeller and a protruding member, c) a second pump impeller is applied to the section jutting through the inlet unit of the turbine shaft, d) a raceway is applied in rotationally fixed arrangement to the said section outside the second pump impeller, e) a slide bearing is applied to the raceway, f) a sealing arrangement is applied to the turbine shaft outside the raceway, and g) a compressor impeller is fastened to that section of the turbine shaft outside the sealing arrangement;

characterized in that the turbomachine comprises a turbocharger which receives for its drive function the exhaust-gases from a combustion engine and in that the tank system and the lubricant-supplying arrangement operate only on lubricant for the turbomachine.

10. An application of a fan arrangement in a jet engine intended for model aeroplanes, which jet engine is provided with an engine shaft, in which the fan arrangement is placed on the engine shaft in front of the compressor to the engine and in which a thrust upon the aeroplane, generated by the engine, is related to the speed of the aeroplane and the frontal area of the engine, characterized in that the fan arrangement is used primarily to achieve minimum dimensioning of the frontal area rather than to help increase the speed capacity of the aeroplane and characterized in that a medium flow, which is generated by the fan arrangement and which can be conducted in a cylindrical gap outside the shell of the compressor and motor, is arranged to form part of a temperature-lowering function for the engine, or in that the engine, by virtue of the fact that the fan capacity can be used for frontal area dimension-reducing measures instead of for flight-speed-capability-increasing measures, can be allocated relatively small dimensions suited to a model aircraft, which can herein be dimensioned relatively small or true to scale, and in that the frontal area of the engine is dimensioned with a diameter or equivalent lying within the range 35–50 mm, and in that the frontal area lies preferably within the range 1,000–100,000 $mm^2$.

11. The device according to claim 9, characterized in that the engine operates at essentially the same speed irrespective of the thrust which is sought at each instant and in that the speed can be regulated by means of the generated air quantity or direction of the fan, a minor regulation of the generated air quantity or direction of the fan producing relatively large changes in the speed of the aircraft, in that the air quantity is controllable with an ejector function disposed at the fan outlet, in that the gas velocity is chosen at about 200 m/s and the maximum speed of the aircraft is about 450 km/hour, in that the relation static thrust/cross-sectional area of the engine is chosen within the range 1.0–2.0 Newton/$cm^2$ and that the fan is of the axial type and the compressor is of the radial type.

12. The device according to claim 1, wherein the turbomachine is in the form of a model jet engine.

13. The device according to claim 1, wherein the turbomachine is in the form of a turbocharger.

14. The device according to claim 2, wherein the vibration-clamping member is arranged to prevent deflections/amplitudes above a level of about a 0.2 mm or less in the turbine shaft.

15. The device according to claim 3, wherein the stopping member is a protruding flange.

16. The device according to claim 3, wherein the turbine shaft is fixed to the compressor impeller by means of threads.

17. The device according to claim 6, wherein the first part of the propellent pumped by the pump impellers comprises about $\frac{1}{10}$ of the propellent from the tank system.

18. The application of a fan arrangement according to claim 10, wherein the front area of the engines measures about 8,000 $mm^2$.

19. The device according to claim 11, wherein the relation static thrust/cross-sectional area of the engine is about 1.5 Newton/$cm^2$.

* * * * *